Feb. 28, 1933.    F. S. PHELPS    1,899,477
FISHING LINE
Filed March 4, 1932
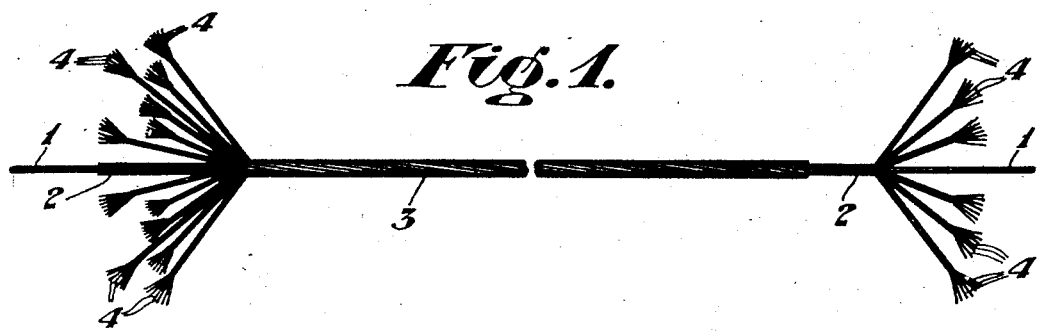
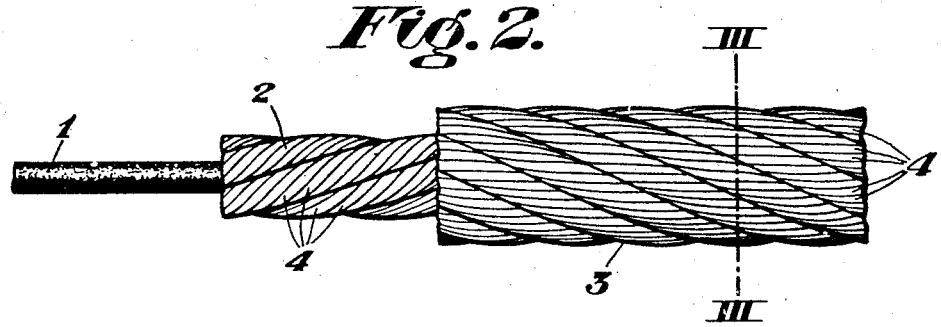
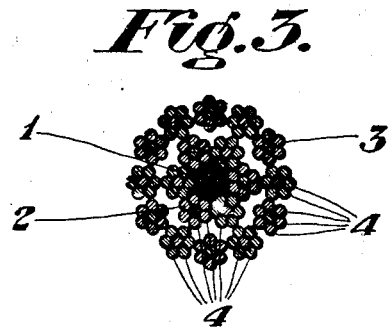
Inventor:
FRED S. PHELPS,
his Attorneys.

Patented Feb. 28, 1933

1,899,477

UNITED STATES PATENT OFFICE

FRED S. PHELPS, OF SAUSALITO, CALIFORNIA, ASSIGNOR TO THE AMERICAN STEEL AND WIRE COMPANY OF NEW JERSEY, A CORPORATION OF NEW JERSEY

FISHING LINE

Application filed March 4, 1932. Serial No. 596,837.

My invention is a fishing line intended to be used in trolling for salmon, fishing for tuna and, in general, wherever a flexible and extremely strong line is necessary. It is my object to construct this line of metal strands so as to meet these requirements. Such a line must, of course, be free from any tendency to untwist when under stress or to disintegrate when subjected to the salt action of ocean water, and I intend that my invention shall successfully overcome these defects.

I construct this fishing line with a fibrous core over which I wind a layer of a number of strands each consisting of minute corrosion resistant wires intertwisted in this layer's winding direction. Then I oppositely wind another layer of strands on this first layer, these strands being constructed exactly like those just described or, in other words, the individual wires are intertwisted oppositely to this last layer's winding direction.

When this line is stressed the resultant torsion forces of the individually intertwisted wires and of the strands approximates zero, thus overcoming any untwisting tendency. This line must be sometimes constructed around an eighth of an inch in diameter or smaller, so the minute size of the solid wires may be appreciated. They are consequently easily subject to fracture when weakened by the corrosive effect of salt water, which occurs if they are not constructed of corrosion resistant metal. This metal may be the well known "eighteen and eight" chrome nickel steel combination or the like.

Having reference to the accompanying drawing:

Figure 1 is an elevation of the invention.

Figure 2 is a greatly enlarged detailed elevation.

Figure 3 is a cross-section on the line III—III of Figure 2.

This drawing illustrates the just described fishing line, showing the core 1; which may be linen, cotton, hemp, etc., the first layer 2 and the second layer 3, each layer being constructed from minute wires 4. As the specific construction of each of these elementary parts, as well as the combination structure, has been carefully described, no further reference thereto is considered necessary.

I claim:

1. A fishing line comprising a fibrous core over which a plurality of strands is arranged in oppositely wound layers, each strand consisting of intertwisted wires of corrosion resistant metal.

2. A fishing line comprising a fibrous core over which a plurality of strands is arranged in oppositely wound layers, these strands consisting of wires of corrosion resistant metal intertwisted in the same direction in all instances.

3. A fishing line comprising a fibrous core over which a plurality of strands is arranged in oppositely wound layers, the strands in the first inside layer consisting of wires of corrosion resistant metal intertwisted in the strands' winding direction and those in the next layer consisting of similar wires intertwisted oppositely to these strands' winding direction.

4. A fishing line comprising a fibrous core over which a plurality of strands is arranged in oppositely wound layers, the strands in the first inside layer consisting of minute wires of corrosion resistant metal intertwisted in the strands' winding direction and those in the next layer consisting of similar wires intertwisted oppositely to these strands' winding direction.

In testimony whereof, I have hereunto set my hand.

FRED S. PHELPS.